United States Patent
Cui et al.

(10) Patent No.: US 10,494,580 B2
(45) Date of Patent: Dec. 3, 2019

(54) VISCOSITY REDUCTION OF HEAVY OILS BY CASHEW NUT SHELL LIQUID FORMULATIONS

(71) Applicant: ETHICAL SOLUTIONS, LLC, South Windsor, CT (US)

(72) Inventors: Zheng Cui, Wallingford, CT (US); George E. Hoag, Storrs, CT (US)

(73) Assignee: Ethical Solutions, LLC, South Windsor, CT (US)

(*) Notice: Subject to any disclaimer, the term of this patent is extended or adjusted under 35 U.S.C. 154(b) by 0 days.

(21) Appl. No.: 14/911,347

(22) PCT Filed: Aug. 14, 2014

(86) PCT No.: PCT/US2014/051057
§ 371 (c)(1),
(2) Date: Feb. 10, 2016

(87) PCT Pub. No.: WO2015/023842
PCT Pub. Date: Feb. 19, 2015

(65) Prior Publication Data
US 2016/0200995 A1    Jul. 14, 2016

Related U.S. Application Data

(60) Provisional application No. 61/866,216, filed on Aug. 15, 2013.

(51) Int. Cl.
*C09K 8/52* (2006.01)
*C10L 1/18* (2006.01)
(Continued)

(52) U.S. Cl.
CPC .................. *C10L 1/18* (2013.01); *C09K 8/52* (2013.01); *C09K 8/58* (2013.01); *C09K 8/584* (2013.01);
(Continued)

(58) Field of Classification Search
CPC ........ C10M 2209/12; C10M 2223/121; C09K 8/685; C10L 1/14
See application file for complete search history.

(56) References Cited

U.S. PATENT DOCUMENTS

| | | | |
|---|---|---|---|
| 5,437,693 A * | 8/1995 | Iizuka | C10L 1/328 44/302 |
| 2002/0066225 A1 | 6/2002 | Puri et al. | |
| 2005/0160661 A1* | 7/2005 | Tuli | C10L 1/02 44/307 |

FOREIGN PATENT DOCUMENTS

| | | |
|---|---|---|
| CN | 103122242 A | 5/2013 |
| IN | 2045CHE2006 | 2/2007 |
| WO | 2010/077141 A1 | 7/2010 |

OTHER PUBLICATIONS

International Search Report dated Mar. 4, 2015 from corresponding International Patent Application No. PCT/US2014/051057; 5 pages.
(Continued)

*Primary Examiner* — Vishal V Vasisth
(74) *Attorney, Agent, or Firm* — Ohlandt, Greeley, Ruggiero & Perle, L.L.P.

(57) ABSTRACT

The present disclosure provides compositions and methods of use of cashew nut shell liquid (CNSL) and its derivatives as one of the components for decreasing the viscosity of heavy oils, extra heavy oils, high asphaltene natural bitumen, and tar sands (i.e., heavy oils). The decrease in viscosity of heavy oils increases the ability of the heavy oil mixture to be piped, transported, stored and used. The present disclosure provides compositions containing at least one of anacardic acid, cardanol and cardol, and at least one of a surfactant, a co-solvent, and water. The present disclosure provides compositions that are useful as viscosity reducing agents, heavy oil upgrading agents, wellbore cleaning agents, enhanced oil recovery agents, and cleaning
(Continued)

| Solvents | Cashew nut shell liquid | Distillate/Cutter Stock | Kerosene | Naphtha | Xylene | D-limonene |
|---|---|---|---|---|---|---|
| Flashpoint (Celsius degree) | 230 | 49 - 71 | 37 - 65 | 10 | 30 | 50 |
| Flashpoint (Fahrenheit degree) | 446 | 120 - 160 | 100 - 160 | 50 | 86 | 122 |
| High Heating Value (BTU/lb) | 19,502 | 20,636 | 19,862 | 20,669 | 18,410 | 19,347 |
| High Heating Value (kJ/kg) | 45,363 | 48,000 | 46,199 | 48,076 | 42,810 | 45,001 |
| Specific Gravity | 0.97 | 0.8 - 0.9 | 0.78 | 0.75 | 0.86 | 0.84 |
| Vapor Pressure | $3.8 \times 10^{-7}$ mm Hg at 25 °C | 0.1 mm Hg at 20 °C | <2 mm Hg at 20 °C | <5 mm Hg at 20 °C | 10 mm Hg at 27.3 °C | 2 mm Hg at 20 °C | agents for asphaltene-containing materials. Biofuel compositions are also provided by the present disclosure.

12 Claims, 3 Drawing Sheets

(51) Int. Cl.
| | |
|---|---|
| C09K 8/58 | (2006.01) |
| C09K 8/584 | (2006.01) |
| C10L 1/16 | (2006.01) |
| C10L 10/00 | (2006.01) |
| C10L 1/19 | (2006.01) |
| C10L 1/14 | (2006.01) |
| C10L 1/185 | (2006.01) |
| C10L 1/32 | (2006.01) |
| C10L 1/183 | (2006.01) |
| C10L 1/189 | (2006.01) |

(52) U.S. Cl.
CPC ............... *C10L 1/14* (2013.01); *C10L 1/1616* (2013.01); *C10L 1/1802* (2013.01); *C10L 1/1857* (2013.01); *C10L 1/19* (2013.01); *C10L 1/328* (2013.01); *C10L 10/00* (2013.01); *C10L 1/189* (2013.01); *C10L 1/1835* (2013.01); *C10L 2200/0469* (2013.01)

(56) References Cited

OTHER PUBLICATIONS

Written Opinion dated Mar. 4, 2015 from corresponding International Patent Application No. PCT/US2014/051057; 7 pages.
Ribeiro et al.; "Evaluation of Moisture Damage in Asphalt Containing Cashew Nut Shell Liquid (CNSL) Modified Bitumen"; in 5th Eurasphalt & Eurobitume Congress; Jun. 15, 2012, 10 pages.
Velmurugan, et al.; "Performance and Emission Characteristics of a DI Diesel Engine Fuelled with Cashew Nut Shell Liquid (CNSL)-Diesel Blends"; International Scholarly and Scientific Research & Innovation, 5(1), 2011, pp. 677-682.
Lucas et al.; "Polymer Science Applied to Petroleum Production"; Pure Appl. Chem., vol. 81, No. 3, pp. 473-494, 2009.
Columbian Office Action for the corresponding Columbian application COU 14-179.437, dated Oct. 11, 2018, 47 pages.

* cited by examiner

| Solvents | Cashew nut shell liquid | Distillate/Cutter Stock | Kerosene | Naphtha | Xylene | D-limonene |
|---|---|---|---|---|---|---|
| Flashpoint (Celsius degree) | 230 | 49 - 71 | 37 - 65 | 10 | 30 | 50 |
| Flashpoint (Fahrenheit degree) | 446 | 120 - 160 | 100 - 160 | 50 | 86 | 122 |
| High Heating Value (BTU/lb) | 19,502 | 20,636 | 19,862 | 20,669 | 18,410 | 19,347 |
| High Heating Value (kJ/kg) | 45,363 | 48,000 | 46,199 | 48,076 | 42,810 | 45,001 |
| Specific Gravity | 0.97 | 0.8 - 0.9 | 0.78 | 0.75 | 0.86 | 0.84 |
| Vapor Pressure | $3.8 \times 10^{-7}$ mm Hg at 25 °C | 0.1 mm Hg at 20 °C | <2 mm Hg at 20 °C | <5 mm Hg at 20 °C | 10 mm Hg at 27.3 °C | 2 mm Hg at 20 °C |

*FIG. 1*

VISCOSITY REDUCTION OF HEAVY OILS BY CASHEW NUT SHELL LIQUID FORMULATIONS

This application is a 371 of International Patent Application No. PCT/US2014051057, filed Aug. 14, 2014, which claims priority to and the benefit of U.S. Provisional Patent Application No. 61/866,216, filed Aug. 15, 2013.

BACKGROUND OF THE DISCLOSURE

1. Field of the Disclosure

The present disclosure relates to compositions and methods of use of cashew nut shell liquid (CNSL) and its derivatives as one of the components for decreasing the viscosity of heavy oils, extra heavy oils, high asphaltene natural bitumen, and tar sands, thereby increasing the ability of the resulting mixture to be piped, transported, stored and used.

2. Description of the Related Art

The heavy oil resource is vast. The estimated volume of technically recoverable heavy oil (434 billion barrels) and natural bitumen (651 billion barrels) in known accumulations is about equal to the Earth's remaining conventional (light) oil reserves. USGS estimates the total resource of heavy oil in known accumulations is 3,396 billion barrels of original oil in place and the total natural bitumen resource is 5,505 billion barrels of original oil in place. Despite abundance of its resource, it remains largely unexploited because of difficulties associated with its recovery, transportation and refining.

Heavy oil is viscous because of the high bitumen/asphaltene content which tends to form aggregates that impede pumpability or flowability of crude oils. The viscosity of heavy oil can be up to a million times more viscous than water. The problem of transporting heavy oil, especially over long distances (>150 km) is acute and the only practical solution currently available is to add a diluent or cutter, such as light petroleum distillates, heat or both to reduce viscosity and enable the flowability for transportation of these materials. Large quantities of heavy oil have been identified worldwide, however economic recovery of these heavy oils is most challenging, particularly with respect to energy required to extract and upgrade oils and the depths at which much of this resource is located.

The disadvantages associated with using solely petroleum-based solvents, diluents or dispersants, to reduce the viscosity of residual fuel oils, heavy oils and tar sands include that they are costly as well as hazardous to transport and handle due to their volatility and combustibility. Management and handling of highly volatile, low flash point and combustible petroleum-based products is also challenging because volatilization losses result in increased environmental and health and safety-related risks, pollution control costs and regulatory requirements. Cutter stock and petroleum distillates that are commonly used as diluents to reduce the viscosity of residual fuel oils, heavy oils and tar sands are paraffinic and known to destabilize suspended asphaltenes in residual fuel oils, heavy oils and tar sands. Destabilization of asphaltenes by paraffin solvents can result in precipitation and subsequent asphaltene sludge accumulations in oil transportation and storage systems, including valves, pumps, pipes and large storage vessels. The presence of asphaltene sludge accumulation in oil transportation and storage systems, including valves, pumps, pipes and large storage vessels creates serious operational problems in their effective and efficient operation resulting in costly repair and maintenance costs.

No. 5 and No. 6 Fuel Oil are defined as residual fuel oils (RFOs) or heavy fuel oils by the American Society for Testing and Materials (ASTM) and are what remains after distillate fuels are removed from crude oil during the refining process. No. 6 Fuel Oil is also referred to as Bunker C oil. No. 6 fuel oil including Bunker C fuel oil is generally used for the production of electric power, space heating, vessel bunkering, and various industrial purposes. No. 6 may contain No. 2 fuel oil to get it to meet specifications. No. 5 fuel oil is a mixture of No. 6 (about 75-80%) with No. 2.

Asphaltenes are polar molecules that stay in suspension in oils because of their outer molecular structure. During thermal cracking in petroleum refineries, the outer molecular structure is modified. If the structure is greatly affected, asphaltenes will become unstable and precipitate forming a sludge. Blending stable petroleum distillates (cutter stock) with residual oil fractions can also affect the stability of the asphaltenic compounds. Cutter stock and gas oil are petroleum distillate derivatives used in blending to reduce the viscosity of heavier residual fuel oils to meet specifications for use to make residual fuel oils and No. 6/Bunker C oil. Because asphaltenes are kept in suspension in heavy oils by the presence of aromatic compounds, when low aromatic content cutter stocks are used to decrease the viscosity of heavy oils, the aromatic content of the oil can become so low that asphaltene precipitation takes place.

Group V oils are defined as oil having an API gravity less than 10 at 60° F. Group V oils include very heavy residual fuel oils, asphalt products, and very heavy crude oils. Public utilities that use residual oils to generate electricity have started to evaluate the use of Group V fuel oils because of their lower costs and higher BTU values. The utility industry refers to these Group V Residual Fuel Oils (GPVRFO) as LAPIO (Low API Oil). GPVRFO are at the lower API gravity end of conventional No. 6 fuel oils. Typically, GPVRFO contain a greater fraction of heavier components than typical No. 6 fuel oils. The production of GPVRFO can include the heavy residues from several refining operations that are typically blended with lighter distillates and by-products. The goal of GPVRFO blending is to meet specifications of viscosity, pour point and sulfur defined by the end user. Incompatibility with various cutter stocks leading to asphaltene precipitation during transport and storage can be a significant problem with GPVRFO products. The use of higher flash point low aromatic content distillate to lower the viscosity of No. 6 and Group V oils can result in flash points being too low with respect to specifications.

Thus, there is a need for a safer, renewable, cost effective, green viscosity reducing agent for extraction of oils as well as the processing and transport of heavy and extra-heavy crude oils, residual fuel oils, and tar sands.

SUMMARY OF THE DISCLOSURE

In accordance with this disclosure, CNSL and compositions incorporating CNSL have been found to provide a safer, renewable, cost effective, green viscosity reducing agent for extraction of oils, as well as the processing and transport of heavy and extra-heavy crude oils, residual fuel oils, and tar sands.

The present disclosure provides formulations for reducing viscosity of oils extracted from the subsurface, as well as the processing and transport of heavy and extra-heavy crude oils, residual fuel oils, and tar sands. For the purposes of this disclosure, tar sands, heavy and extra heavy oils, residual fuels, No. 6 oil, Bunker C oil, high asphaltene natural bitumen are collectively referred to as "heavy oils." The formulation of this disclosure comprises a blend of CNSL, with optionally surfactants, water, and co-solvents including biodiesel, with heavy oils. The final viscosity of the crude oil is significantly lower than the initial viscosity of the crude oil.

In an embodiment, the present disclosure provides a method for reducing viscosity of a heavy oil. The method comprises adding cashew nut shell liquid (CNSL) to the heavy oil in an amount sufficient to reduce viscosity of the heavy oil. The CNSL can be blended with at least one of a surfactant, water, and co-solvent. The method can further comprise adding at least one of anacardic acid, cardanol and cardol to the heavy oil.

In another embodiment, the present disclosure provides a method for reducing viscosity of a heavy oil. The method comprises adding at least one of anacardic acid, cardanol and cardol to the heavy oil in an amount sufficient to reduce viscosity of the heavy oil. The at least one of anacardic acid, cardanol and cardol can be blended with at least one of a surfactant, water, and co-solvent. The method can further comprise adding CNSL to the heavy oil.

The present disclosure provides a composition comprising a heavy oil and cashew nut shell liquid (CNSL). The CNSL is present in an amount sufficient to reduce viscosity of the heavy oil. The CNSL can be blended with at least one of a surfactant, water, and co-solvent. The composition can further comprise at least one of anacardic acid, cardanol and cardol.

The present disclosure also provides a composition comprising a heavy oil and at least one of anacardic acid, cardanol and cardol. At least one of anacardic acid, cardanol and cardol are present in an amount sufficient to reduce viscosity of the heavy oil. At least one of anacardic acid, cardanol and cardol can be blended with at least one of a surfactant, water, and co-solvent. The composition can further comprise CNSL.

In an embodiment, the present disclosure provides a composition comprising at least one of anacardic acid, cardanol and cardol, and at least one of a surfactant, a co-solvent, and water. The composition can further comprise CNSL.

The compositions of this disclosure are useful for a variety of applications. In addition to a viscosity reducing agent, the compositions can be used as an enhanced oil recovery agent, a heavy oil upgrading agent, a wellbore cleaning agent, and a cleaning agent for asphaltene-containing materials.

These and other systems, methods, objects, features, and advantages of the present disclosure will be apparent to those skilled in the art from the following detailed description of the preferred embodiment and the drawings.

BRIEF DESCRIPTION OF THE DRAWINGS

FIG. 1 is a table showing physical properties CNSL and of different solvents used in oil fields.

DESCRIPTION OF THE EMBODIMENTS

Figure 2:
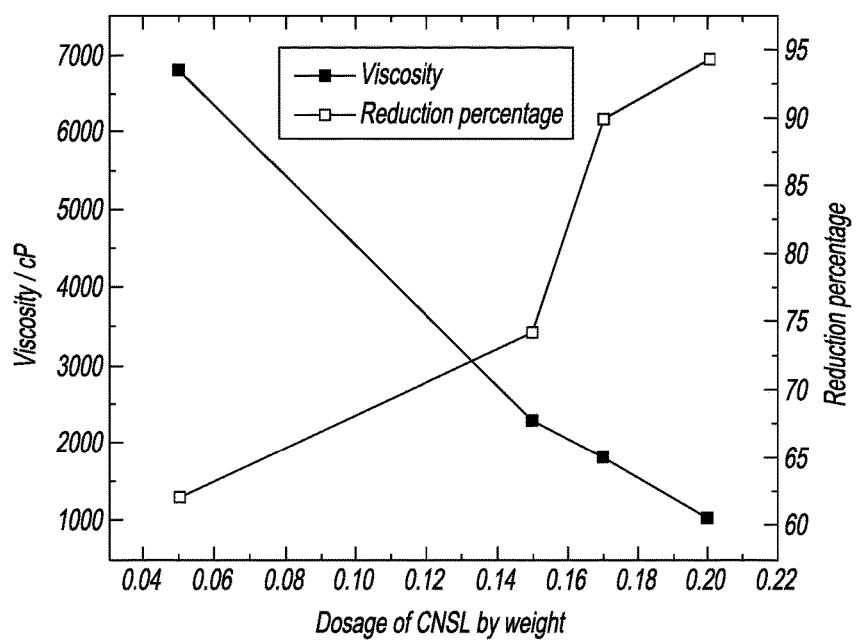
FIG. 2 graphically depicts viscosity reduction in heavy oil samples as a result of CNSL treatment at 50° C. as described in Example 1 below.

Embodiments of the present disclosure are described more fully hereinafter with reference to the accompanying drawings, in which some, but not all, embodiments of the present disclosure are shown. Indeed, the present disclosure can be embodied in many different forms and should not be construed as limited to the embodiments set forth herein. Rather, these exemplary embodiments are provided so that the present disclosure satisfies applicable legal requirements. Also, like numbers refer to like elements throughout.

In accordance with this disclosure, CNSL either used alone or in combination with surfactants, water, and co-solvents overcomes many limitations of using petroleum based solvents alone to reduce the viscosities of residual fuel oils, heavy oils and tar sands. In addition to being a biofuel, an antioxidant and an asphaltene dispersant, CNSL has a very low vapor pressure ($3.8 \times 10^{-7}$ mm Hg at 25° C.) and a high flash point (230° C.) and has a very low risk of volatilization losses and inadvertent combustion events. The flash points of CNSL, residual fuels, and different solvents commonly used in the for the reduction of oil viscosities associated with the extraction of oil and gas from the subsurface, or surface deposits as in the case of tar sands, as well as the processing and transport of heavy and extra-heavy crude oils, residual fuel oils are listed in FIG. 1.

Cashew nut shell liquid (CNSL) shows a much higher flash point (230° C.) when compared to other common hydrocarbon solvents. CNSL has a gross calorific value (high heating value) of 45,363 kJ/kg, which is comparable to residual fuel oils. An additional benefit of using CNSL to lower the viscosity of heavy and extra-heavy crude oils and residual fuel oils in this instant disclosure is that the risk of exceeding a low limit flash point specification of a residual fuel basically is non-existent. With a high vapor pressure-low flash point petroleum distillate, there is a risk that the amount of the distillate required to lower the viscosity of a heavy oil to meet a viscosity specification by diluent effects alone, can result in exceeding the minimum flash point associated with the fuel. Additionally, unlike CSNL, the price of petroleum-based cutters or distillates is strongly affected by the international crude oil price. In contrast, the price of CNSL made from cashew nut shells is not directly linked to the price of crude oil. The use of CNSL as a viscosity reducing agent for heavy and extra-heavy crude oils, residual fuel oils, and tar sands represents a plant-based renewable resource and the use of a waste agricultural product. CNSL is a biofuel, derived from a cellulosic plant may qualify for tax credits depending on the state and/or country in which is it used for viscosity reduction.

In accordance with this disclosure, CNSL and compositions incorporating CNSL provide a safer, renewable, cost effective, green viscosity reducing agent for extraction of oils as well as the processing and transport of heavy and extra-heavy crude oils, residual fuel oils, and tar sands.

CSNL is extracted from cashew-nut shells, which contains approximately 70% anacardic acid, 18% cardol, and 5% cardanol, with the remainder being made up of other phenols and less polar substances. In technical (i.e., heat extracted) CNSL, the heating process leads to decarboxylation of the anacardic acid to form cardanol. Typically, the composition of technical CNSL is approximately 52% cardanol, 10% cardol, 30% polymeric material, with the remainder being made up of other substances. Technical CNSL is often further processed by distillation at reduced pressure to remove the polymeric material. The composition of distilled technical CNSL is approximately 78% cardanol, 8% cardol, 2% polymeric material, <1% 2-methyl cardanol, 2.3% heptadecyl homologue triene, 3.8% heptadecyl homologue diene and the remainder other homologous phenols.

The structure of anacardic acid, cardanol and cardol are represented by the formulae below.

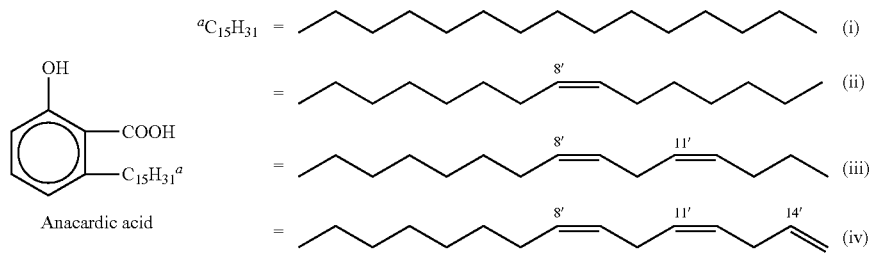

In addition to cashew nut shell liquid, additional sources of anacardic acid, cardanol and cardol may be used in the present disclosure. Additional plant sources of anacardic acid, cardanol and cardol may also be used. The additional plant sources may include, but are not limited to, mangos and ginkgo and plants of the family Anacardiaceae.

Based on volatile organic compound (VOC) and semi-volatile organic compound (SVOC) analysis using EPA method 8260C and 8270D respectively, no EPA listed VOC or SVOC compounds have been detected with reporting limits of 2.5 mg/L for each VOC compound and 500 mg/L for each SVOCs compound. First and second degradation temperatures, respectively are as follows: crude CNSL (335° C. and 522° C.), CNSL residue (296° C. and 534° C.) distilled CNSL (296° C., first degradation temperature only as >90 percent of the distilled CNSL was lost at this temperature). CNSL materials have been found to be thermally stable in the range of temperatures used to heat heavy hydrocarbon products during extraction from the subsurface, transportation and storage.

CNSL has been found to be "ready biodegradable" using OECD Method 301D with 96 percent degradation after 28 days. From a chemical fate and transport perspective, CNSL has been found to be a chemical mixture with a low water solubility (0.305 mg/L at 20° C.) and low vapor pressure ($3.8 \times 10^{-7}$ mmHg at 25° C.) and is expected to have a low mobility in soils. The octanol-water partition coefficient (log $K_{ow}$) is very low at 6.2, indicating the high degree of hydrophobicity of this compound. The rate of hydrolysis in water is expected to be low and the rate of photolysis is expected to be high. CNSL is expected to have a low persistence in the environment and a low bioaccumulation potential.

The No-Observed-Adverse-Level (NOAEL) represents the level of exposure of an organism found by experiment or observation, where there is no biologically or statistically significant increase in the frequency or severity of any adverse effects in the exposed population when compared to its appropriate controls. The acute oral toxicity for CNSL has been found to be low with a NOAEL systematic toxicity, reproductive toxicity of 150 mg/kg-day and a NOAEL for reproductive toxicity of 1,000 mg/kg-day. The potential health hazard of CNSL is low. The acute hazard of cardanol to fish, aquatic invertebrates, and aquatic plants has been found to have toxicity values of 0.001 mg/L, 0.004 mg/L, and 0.010 mg/L, respectively.

The present disclosure provides a composition comprising a heavy oil and cashew nut shell liquid (CNSL). The CNSL is present in an amount sufficient to reduce viscosity of the heavy oil. The CNSL can be blended with at least one of a surfactant, water, and co-solvent. The composition can further comprise at least one of anacardic acid, cardanol and cardol.

The present disclosure also provides a composition comprising a heavy oil and at least one of anacardic acid, cardanol and cardol. The at least one of anacardic acid, cardanol and cardol are present in an amount sufficient to reduce viscosity of the heavy oil. The at least one of anacardic acid, cardanol and cardol can be blended with at least one of a surfactant, water, and co-solvent. The composition can further comprise CNSL.

The present disclosure further provides a composition comprising at least one of anacardic acid, cardanol and cardol, and at least one of a surfactant, a co-solvent, and water. The composition can further comprise CNSL.

In an embodiment of this disclosure, a composition is provided wherein CNSL is added alone to heavy oils to reduce viscosity. The CNSL composition added to heavy oils may optionally include other components, including surfactants, co-surfactants, co-solvents, water, pH modifiers and buffers, rheology modifiers, biological agents, water, biodiesel, plant based solvents (for example, but not limited to distilled CNSL, terpenes and methyl soyate), and light hydrocarbons distillates. For this purposes of this disclosure, the addition to CNSL of one or more combinations of surfactants, co-surfactants, co-solvents, water, pH modifiers and buffers, rheology modifiers, biological agents, water, biodiesel, plant based solvents and light hydrocarbons distillates is referred to as a CNSL additive.

In another embodiment of this disclosure, heat can be added to the CNSL and CNSL additive. The temperature of the CNSL or CNSL additive with heavy oil is controlled to be in the range of 30° C. to 100° C. Preferably, the temperature of the CNSL or CNSL additive with heavy oil is controlled to be in the range of 50° C. to 65° C.

The pH of the CNSL or CNSL additive mixture with heavy oil composition is less than 10. The pH is adjusted with organic acid, a mineral acid or a base. The CNSL used alone or in the CNSL additive is produced one or more of a variety of methods, including open pan roasting, drum roasting, hot oil roasting, cold extrusion, hot oil and/or solvent extraction, cold solvent extraction, and vacuum assisted extraction.

The CNSL can be processed using distillation and/or vacuum distillation to become a co-solvent used in the CNSL additive composition.

The surfactant used in the CNSL additive composition can be anionic, cationic, nonionic or amphoteric, and combinations. The anionic surfactant is selected from carboxylic acids, ester carboxylic acids, alkyl sulfates, alkyl ether sulfates, alkyl sulfonates, alkyl aryl sulfonates, sulfosuccinates, sulfo fatty acid esters, fatty acid isethionates and taurides, phosphoric acids and salts, acyl glutamates and salts, acyl peptides, and acyl sarcosides. The cationic surfactant is selected from alkyl amines, alkylimidazolines, quaternary ammonium compounds, such as: tetraalkyl(-aryl) ammonium salts, heterocyclic ammonium salts, alkyl betaines; ethoxylated alkyl amines, esterified quaternaries. The preferred cationic surfactant is an alkyl betaine.

The nonionic surfactant is selected from alcohols, alkyloxylated alcohols, such as ethoxylated or propoxylated alcohols; ethylene oxide/propylene oxide block polymers, alkylpolyglucosides, ethoxylated oils and fats, alkanolamides, ethoxylated alkanolamides, ethoxylated fatty acids, glycol esters, glycerol esters, sorbitan esters, alkyl carbohydrate esters, trimesters of phosphoric acids and amine oxides. The preferred non-ionic surfactant is a fatty alcohol ethoxylate, a fatty acid ethoxylate, a fatty acid methyl ester ethoxylate or a alkyl polyglucoside, or a mixture thereof. The non-ionic plant oil surfactant is derived from the group of ethoxylated plant oil-based surfactants consisting of polyethylene glycol (PEG) coco fatty acids with a preferred range of 4 to 40 PEG groups and a most preferred number of PEG groups of 9. The Hydrophile-Lipophile Balance (HLB) range for the PEG coco fatty acid is 10 to 19 with a preferred HLB range of 5-9. The amphoteric surfactant is selected from the group of acyl ethylenediamines, n-alkyl amino acids, and imino diacids.

The concentration range of the CNSL in the heavy oil can range from about 1 to about 30 percent by weight, with a preferred range varying from about 10 to about 15 weight percent. The concentration of the surfactant can range from about 0.1 to about 5 weight percent, with a preferred range of about 0.25 to about 0.5 weight percent. The concentration of water can range from 0.0 to about 1.0 weight percent.

The co-solvent is selected from petroleum distillates with a boiling point range lower than the heavy oil, a terpene, methyl soyate, ethyl lactate, methyl lactate, ethyl acetate, distilled cashew nut shell liquid and mixtures thereof. The co-solvent is present in concentration range of from about 1 to about 29 percent, with a preferred concentration range of about 2.5 to about 7.5 percent. The surfactant may be a Gemini surfactant.

The present disclosure provides a method for reducing viscosity of a heavy oil. The method comprises adding cashew nut shell liquid (CNSL) to the heavy oil in an amount sufficient to reduce viscosity of the heavy oil. The CNSL can be blended with at least one of a surfactant, water, and co-solvent. The method can further comprise adding at least one of anacardic acid, cardanol and cardol to the heavy oil.

The present disclosure provides another method for reducing viscosity of a heavy oil. The method comprises adding at least one of anacardic acid, cardanol and cardol to the heavy oil in an amount sufficient to reduce viscosity of the heavy oil. The at least one of anacardic acid, cardanol and cardol can be blended with at least one of a surfactant, water, and co-solvent. The method can further comprise adding CNSL to the heavy oil.

In an embodiment of this disclosure, a method is disclosed wherein CNSL is added alone to heavy oils to reduce viscosity. In another embodiment of this disclosure, a method is disclosed to reduce the viscosity of heavy oils where the CNSL composition added to heavy oils may optionally include other components, wherein the other components are selected from one or more of surfactants, co-surfactants, co-solvents, water, pH modifiers and buffers, rheology modifiers, biological agents, water, biodiesel, plant based solvents (for example, but not limited to distilled CNSL, terpenes and methyl soyate), and light hydrocarbons distillates.

In accordance with the method of this disclosure, heat can be added to the CNSL and CNSL additive. The temperature of the CNSL or CNSL additive with heavy oil is controlled to be in the range of 30° C. to 100° C. Preferably, the temperature of the CNSL or CNSL additive with heavy oil is controlled to be in the range of 50° C. to 65° C.

In accordance with the method of this disclosure, the pH of the CNSL or CNSL additive mixture with heavy oil composition is adjusted so that it is less than about 10. The pH can be adjusted with organic acid, a mineral acid or a base.

The method of this disclosure may be carried out by conventional steps known in the art. The steps associated with the methods and processes described herein can be performed in any order. For example, as described herein, CNSL is added alone to heavy oils or a CNSL composition containing other components (e.g., a surfactant, co-solvent, and/or water) can be added to heavy oils by conventional procedures known in the art.

In an embodiment of this disclosure, a method is disclosed to reduce the viscosity of heavy oils when heat is added to the CNSL and CNSL additive. A method is disclosed to reduce the viscosity of heavy oils when the temperature of the CNSL or CNSL additive with heavy oil is controlled to be in the range of 30° C. to 100° C., preferably in the range of 50° C. to 65° C.

The compositions of this disclosure can be used for a variety of applications. In addition to a viscosity reducing agent, the compositions can be used as an enhanced oil recovery agent, a heavy oil upgrading agent, a wellbore cleaning agent, and a cleaning agent for asphaltene-containing materials.

The wellbore cleaner is formulated to cleanout paraffin, wax, asphaltene, hydrocarbon or other blockages in and around the well bore. The wellbore cleaner does not contain harmful acids or caustics that could potentially corrode or damage pipelines and formations. The well bore cleaner is used in a batch and soak application, where the solution is pumped down the tubing into the wellbore to clean debris caused by organic deposits. Soaking periods in the well bore vary from four to 16 hours. A swabbing unit is often used to swab back the solvent upon completion of the soaking period. Further subsequent water flush followed by a swab may also be beneficial.

The present disclosure also provides biofuel-containing products. More particularly, biofuel compositions are provided that are derived from CNSL, or from a heavy oil and CNSL. Also, biofuel compositions are provided that are derived from at least one of anacardic acid, cardanol and cardol, or from a heavy oil and at least one of anacardic acid, cardanol and cardol. The biofuel compositions may contain at least one of CNSL, anacardic acid, cardanol and cardol. The biofuel-containing products offer economic advantages, for example, tax credits for the sale or use thereof.

The terms "comprises" or "comprising" are interpreted as specifying the presence of the stated features, integers, steps or components, but not precluding the presence of one or more other features, integers, steps or components or groups thereof.

It should be understood that various alternatives, combinations and modifications of the present disclosure could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The following examples are provided to offer additional description of the compositions and methods disclosed and claimed in this patent. These are exemplary only, and are not intended to limit the disclosure in any aspect. All proportions and percentages set out herein are by weight unless the contrary is stated.

Example 1

A heavy residual oil, having a viscosity of 17,880 cP at 50° C., was blended into separate samples containing various proportions of CNSL. Bulk oil samples were maintained at 50° C. After adding the viscosity reducing additive to the oil samples, the sample containers were capped and shaken thoroughly by hand. The samples were placed back in a 50° C. incubator for 24 hours. Viscosities of the oil samples were then measured at 50° C. After treatment using this composition and method; when CNSL was added to the heavy crude oil at a 20 percent by weight ratio, the viscosity was reduced to about 1,020 cP, representing a viscosity reduction of 94.3% at 50° C. The changes in viscosity results following the addition of various concentrations of CNSL alone to the high asphaltene heavy oil are shown in FIG. 2 and in Table A below.

TABLE A

| Treatment | Viscosity (cP at 50° C.) | Viscosity reduction percentage |
| --- | --- | --- |
| Control (no treatment) | 17,880 | N.A. |
| 5% CNSL by weight | 6,800 | 62 |
| 15% CNSL by weight | 2,280 | 74.1 |
| 17% CNSL by weight | 1,800 | 89.8 |
| 20% CNSL by weight | 1,020 | 94.3 |

Example 2

Three different commercial sources of CNSL were tested as the viscosity reducing agent, using the procedure described in Example 1. The purpose of this test was to determine if different sources of CNSL (from different countries) had an effect on the viscosity reducing properties of the CNSL. Each CNSL product was tested at separate times but with the same residual fuel oil. Therefore, the viscosity results for three separate untreated controls (untreated residual fuel oil) are presented in Table B below. The results are listed in Table B. The results show that the viscosity reduction at the same dosage levels was consistent regardless of the country of origin of the CNSL.

TABLE B

| Treatment | Viscosity/cP at 50° C. | Viscosity reduction percentage |
| --- | --- | --- |
| Control 1 | 17,880 | N.A. |
| 5% CNSL A | 6,800 | 62 |
| 15% CNSL A | 2,280 | 74.1 |
| Control 2 | 19,320 | N.A. |
| 5% CNSL B | 8,520 | 55.9 |
| 15% CNSL B | 2,360 | 87.8 |
| Control 3 | 21,480 | N.A. |
| 5% CNSL C | 9,280 | 56.8 |
| 15% CNSL C | 2,640 | 87.7 |

Example 3

The test method was same as described in Example 1. A high asphaltene heavy residual fuel oil was used in this example. A CNSL additive (CNSL+surfactant+water) was prepared containing 89.1% cashew nut shell liquid, 1% non-ionic surfactant, and 9.9% of water by weight. The formulation was then added to heavy residual fuel oil at a dosage of 15% by weight. When the CNSL additive with the CNSL, surfactant plus water was added to the heavy residual oil under the test conditions the viscosity was reduced from 21,480 cP at 50° C. to 2,440 cP at 50° C., a reduction of 88.8%. In comparison to a test conducted on the residual fuel oil with pure CNSL added at a concentration dose of 15%, the viscosity reduction with CNSL alone was less (2,640 cP at 50° C.) and also a lower percent viscosity reduction (87.7%). It is evident that the CNSL additive comprising CNSL, surfactant and water performed better in reducing the viscosity of the heavy residual fuel while containing a lower concentration of CNSL liquid (i.e., 10.9% less CNSL used). When water and CNSL alone comprised a CNSL additive, the reduction in viscosity was far less than both CNSL alone and CNSL with surfactant and water. The results are shown in Table C below. It is evident that the combination of CNSL with surfactant and water provided the most effective reduction of viscosity.

TABLE C

| Treatment | Viscosity/cP at 50° C. | Viscosity reduction percentage |
| --- | --- | --- |
| Control 1 | 21,480 | N.A. |
| 15% CNSL | 2,640 | 87.7 |
| Control 2 | 21,840 | N.A. |
| 15% (CNSL + surfactant + water) | 2,440 | 88.8 |
| 15% (CNSL + water) | 3,680 | 83.2 |

Example 4

Using the same test methods described in Example 1, distilled technical CNSL was tested as a viscosity reducing agent for a heavy residual crude oil with initial viscosity of 19,840 cP. On average, the efficacy of using distilled technical CNSL as a viscosity reducing agent is better than using undistilled CNSL. The main component in distilled technical CNSL is cardanol but the main component in undistilled CNSL is anacardic acid. Therefore it was concluded that cardanol is more effective than anacardic acid as a heavy oil viscosity reducing agent. The results are shown in Table D below.

TABLE D

| Treatment | Viscosity/cP at 50° C. | Viscosity reduction percentage |
| --- | --- | --- |
| 5% CNSL by weight | 6,800 | 62 |
| 15% CNSL by weight | 2,280 | 74.1 |
| Control 2 | 19,840 | N.A. |
| 5% distilled technical CNSL by weight | 7,480 | 62.3 |
| 15% distilled technical CNSL by weight | 1,560 | 92.1 |

Example 5

Using the same test methods described in Example 1, a composition of another CNSL additive comprising CNSL and a light petroleum distillate was tested as a viscosity reducing agent for a heavy residual oil with original viscosity of 19,320 cP. Two different ratios of CNSL to distillate were tested at a total CNSL additive dose of 15 percent by weight. In both cases there was a greater reduction in viscosity at a total additive concentration of 15 percent by weight than when CNSL was used alone at 15%. When the ratio of CNSL to distillate was 4.5:1 (CNSL final concentration in heavy oil sample was 12.7% and final concentration of petroleum distillate in heavy oil sample was 2.8%), the resulting viscosity at 50° C. was 1,400 cP. This is significantly lower than when 15 percent by weight CNSL alone was added to the heavy residual oil which was 2,280 cP at 50° C. When the ratio of CNSL to distillate was 2.7:1 (final concentration of CNSL in the heavy oil sample was 11.3% and final concentration of petroleum distillate in heavy oil sample was 4.1%), the resulting viscosity at 50° C. was 1,120 cP. The flash point of this formulation was 134° F. This is also is significantly lower than when 15 percent by weigh CNSL alone was added to the high asphaltene crude oil which was 2,200 cP at 50° C. and when a 15 percent by weight CNSL additive with a 4.5:1 weight ratio of CNSL to distillate was used. The viscosity reduction when crude oil treated with 15% petroleum distillate was about 95.6%. Therefore incorporating petroleum distillate in CNSL containing formulations enhances viscosity reduction, but lowers the flash point. The results are shown in Table E below.

TABLE E

| Treatment | Viscosity/ cP at 50° C. | Viscosity reduction percentage |
|---|---|---|
| Control | 19,320 | N.A. |
| 15% CNSL with petroleum distillate (weight ratio of CNSL to distillate equals 4.5:1) | 1,400 | 92.8% |
| 15% CNSL with petroleum distillate (weight ratio of CNSL to distillate equals 2.7:1) | 1, 120 | 94.2% |
| Control 2 | 17,880 | N.A. |
| 15% Distillate | 780 | 95.6% |

It is evident that one ordinarily skill in the art would understand that various CNSL and petroleum distillate fractions can be added to heavy oils resulting in a combination of lower viscosity and high flash point values. The incorporation of CNSL into normal petroleum distillate-heavy oil mixtures can serve to raise the flash point of the resulting product, while meeting viscosity specifications and criteria.

Example 6

Figure 3:
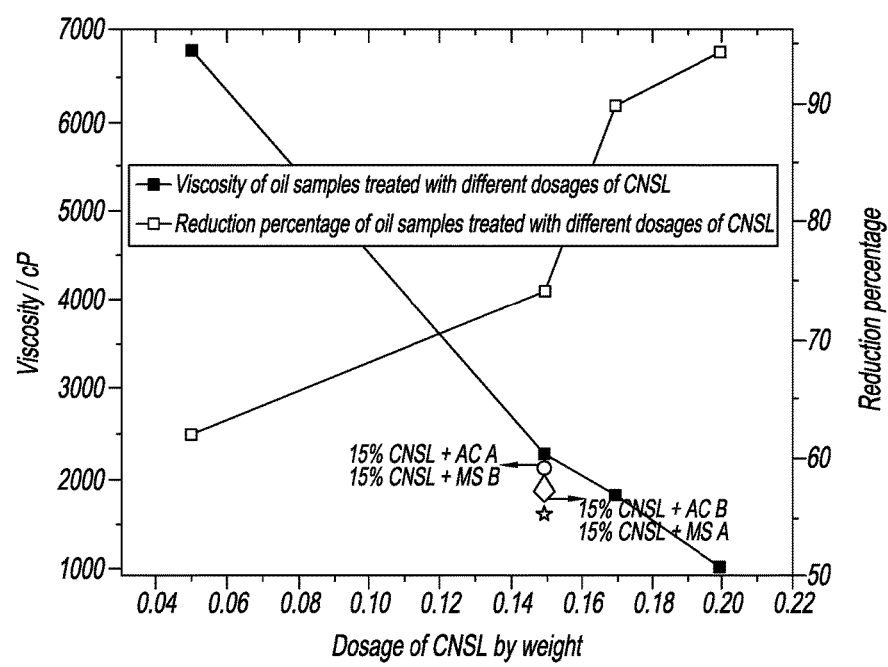
FIG. 3 graphically depicts viscosity reduction in heavy oil samples as a result of CNSL and CNSL blending formulation treatment at 50° C. as described in Example 6 below.

Compositions of CNSL additives consisting of CNSL with methyl soyate or CNSL with acetophenone were tested as viscosity reducing agents for a heavy crude oil with an original viscosity of 19,320 cP. The test method was the same as described in Example 1. Methyl soyate is a renewable resource biofuel derived from soybeans. It can be seen from examination of the viscosity results in Table F below that the addition of methyl soyate and acetophenone to CNSL lowered the viscosity of the residual heavy oil in comparison to when CNSL alone was used at an additive dose of 15%. The reduction of viscosity was greatest when the CNSL additive consisted of a 7:1 ratio of CNSL to methyl soyate dosed at 15%. It is important to note that the viscosity reduction of the CNSL methyl soyate additive decreased in effectiveness when the ratio of CNSL to methyl soyate decreased to 2.7:1, representing an optimal ratio greater than 2.7:1. The viscosity data for oil samples treated with CNSL, CNSL with methyl soyate (CNSL+MS) or CNSL with acetophonone (CNSL+AC) are shown in FIG. 3. It is apparent that the use of CNSL+MS or CNSL+AC provides greater viscosity reduction than CNSL alone at a dosage of 15 wt %.

TABLE F

| Treatment | Viscosity/cP at 50° C. | Viscosity reduction percentage |
|---|---|---|
| Control 1 | 19,320 | N.A. |
| 15% CNSL + MS A[1] | 1,600 | 91.7% |
| 15% CNSL + MS B[2] | 1,960 | 89.9% |
| 15% CNSL + AC A[3] | 2,120 | 89.3% |
| 15% CNSL + AC B[4] | 1,880 | 90.3% |
| 15% CNSL Alone | 2,280 | 74.1% |

[1]CNSL + MS A: CNSL with methyl soyate blending A and the weight ratio of CNSL to methyl soyate is 7:1
[2]CNSL + MS B: CNSL with methyl soyate blending B and the weight ratio of CNSL to methyl soyate is 4.7:1
[3]CNSL + AC A: CNSL with acetophenone blending A and the weight ratio of CNSL to acetophenone is 16.7:1
[4]CNSL + AC B: CNSL with acetophenone blending B and the weight ratio of CNSL to acetophenone is 11:1

Example 7

A viscosity reduction test was conducted on an extremely heavy oil. The initial viscosity is greater than 59,999 cP at 50° C. (the limit of the viscometer with a specific spindle). The oil was a solid at room temperature and at 50° C. In an extremely heavy oil sample, CNSL demonstrated effectiveness in reducing the viscosity. At a dosage of 15%, the performance was comparable to petroleum distillate. At higher dosage, petroleum distillate is slightly more effective. It is anticipated that using CNSL additives described in previous examples, that mixtures of CNSL, surfactant, water and co-solvents would further the effectiveness of viscosity reduction in the heavy oil in this disclosure. The results are shown in Table G below.

TABLE G

| Treatment | Viscosity/cP at 50° C. |
|---|---|
| 20% CNSL | 11,880 |
| 20% petroleum distillate | 3,240 |
| 15% CNSL | 31,900 |
| 15% petroleum distillate | 27,700 |

What is claimed is:
1. A method for reducing viscosity of a heavy oil for extraction of the heavy oil from a subsurface, or for processing or transport of the heavy oil, the method comprising adding cashew nut shell liquid (CNSL), at least one of anacardic acid, cardanol and cardol, at least one surfactant, and optionally water, to the heavy oil in an amount sufficient to reduce viscosity of the heavy oil, wherein the CNSL is added in an amount of from about 1 to about 30 weight percent, the at least one of anacardic acid, cardanol and cardol is added in an amount of from about 1 to about 30 weight percent, the surfactant is added in an amount of from about 0.1 to about 5 weight percent, and the optional water is added in an amount of from about 0.0 to about 1.0 weight percent, each based on the total weight of the heavy oil; wherein the heavy oil is selected from the group consisting of tar sands, extra heavy oils, residual fuels, No. 6 oil, Bunker C oil, a Group V oil, and high asphaltene natural bitumen.

2. The method of claim 1, wherein the method further comprises adding one or more of co-surfactants, co-solvents, pH modifiers and buffers, rheology modifiers, biological agents, biodiesel, plant based solvents, and light hydrocarbons distillates, to the heavy oil.

3. A composition comprising a heavy oil, cashew nut shell liquid (CNSL), at least one of anacardic acid, cardanol and cardol, at least one surfactant, and optionally water, the CNSL, the at least one of anacardic acid, cardanol and cardol, the at least one surfactant, and the optionally water, present in an amount sufficient to reduce viscosity of the heavy oil for extraction of the heavy oil from a subsurface, or for processing or transport of the heavy oil, wherein the CNSL is present in an amount of from about 1 to about 30 weight percent, the at least one of anacardic acid, cardanol and cardol is present in an amount of from about 1 to about 30 weight percent, the surfactant is present in an amount of from about 0.1 to about 5 weight percent, and the optional water is present in an amount of from about 0.0 to about 1.0 weight percent, each based on the total weight of the heavy oil; wherein the heavy oil is selected from the group consisting of tar sands, extra heavy oils, residual fuels, No. 6 oil, Bunker C oil, a Group V oil, and high asphaltene natural bitumen.

4. The composition of claim 3, further comprising one or more of co-surfactants, co-solvents, pH modifiers and buffers, rheology modifiers, biological agents, biodiesel, plant based solvents, and light hydrocarbons distillates.

5. The composition of claim 3, for use as a viscosity reducing agent, an enhanced oil recovery agent, a heavy oil upgrading agent, a wellbore cleaning agent, or a cleaning agent for asphaltene-containing materials.

6. A biofuel composition comprising the composition of claim 3.

7. A biofuel composition containing CNSL, at least one of anacardic acid, cardanol and cardol, at least one surfactant, optionally water, and a heavy oil; wherein the CNSL is present in an amount from about 10 weight percent to about 15 weight percent, the at least one of anacardic acid, cardanol and cardol is present in an amount of from about 1 to about 30 weight percent, the surfactant is present in an amount of from about 0.1 to about 5 weight percent, and the optional water is present in an amount of from about 0.0 to about 1.0 weight percent, each based on the total weight of the heavy oil; wherein the heavy oil is selected from the group consisting of tar sands, extra heavy oils, residual fuels, No. 6 oil, Bunker C oil, a Group V oil, and high asphaltene natural bitumen.

8. The method of claim 1, wherein the CNSL is added in an amount from about 10 weight percent to about 15 weight percent, based on the total weight of the heavy oil.

9. The composition of claim 3, wherein the CNSL is added in an amount from about 10 weight percent to about 15 weight percent, based on the total weight of the heavy oil.

10. A method for reducing viscosity of a heavy oil for extraction of the heavy oil from a subsurface, or for processing or transport of the heavy oil, the method comprising adding cashew nut shell liquid (CNSL), at least one of anacardic acid, cardanol and cardol, at least one surfactant, and optionally water, to the heavy oil in an amount sufficient to reduce viscosity of the heavy oil, wherein the CNSL is added in an amount of from about 10 to about 15 weight percent, the at least one of anacardic acid, cardanol and cardol is added in an amount of from about 1 to about 30 weight percent, the surfactant is added in an amount of from about 0.25 to about 0.5 weight percent, and the optional water is added in an amount of from about 0.0 to about 1.0 weight percent, each based on the total weight of the heavy oil; wherein the heavy oil is selected from the group consisting of tar sands, extra heavy oils, residual fuels, No. 6 oil, Bunker C oil, a Group V oil, and high asphaltene natural bitumen.

11. A composition comprising a heavy oil, cashew nut shell liquid (CNSL), at least one of anacardic acid, cardanol and cardol, at least one surfactant, and optionally water, the CNSL present in an amount sufficient to reduce viscosity of the heavy oil for extraction of the heavy oil from the substance, or for processing or transport of the heavy oil, wherein the CNSL is present in an amount of from about 10 to about 15 weight percent, the at least one of anacardic acid, cardanol and cardol is present in an amount of from about 1 to about 30 weight percent, the surfactant is added in an amount of from about 0.25 to about 0.5 weight percent, and the optional water is present in an amount of from about 0.0 to about 1.0 weight percent, each based on the total weight of the heavy oil; wherein the heavy oil is selected from the group consisting of tar sands, extra heavy oils, residual fuels, No. 6 oil, Bunker C oil, a Group V oil, and high asphaltene natural bitumen.

12. A biofuel composition comprising CNSL, at least one of anacardic acid, cardanol and cardol, at least one surfactant, optionally water, and a heavy oil, wherein the CNSL is present in an amount from about 10 weight percent to about 15 weight percent, the at least one of anacardic acid, cardanol and cardol is present in an amount of from about 1 to about 30 weight percent, the surfactant is present in an amount of from about 0.25 to about 0.5 weight percent, and the optional water is present in an amount of from about 0.0 to about 1.0 weight percent, each based on the total weight of the heavy oil; wherein the heavy oil is selected from the group consisting of tar sands, extra heavy oils, residual fuels, No. 6 oil, Bunker C oil, a Group V oil, and high asphaltene natural bitumen.

* * * * *